(12) United States Patent
Baron et al.

(10) Patent No.: US 11,201,918 B2
(45) Date of Patent: Dec. 14, 2021

(54) MINIMIZING NUMBER OF SYNCHS

(71) Applicant: Snap Inc., Santa Monica, CA (US)

(72) Inventors: Bradley Baron, Seattle, WA (US); Benjamin Ralph Hollis, Seattle, WA (US); Jason Varbedian, Seattle, WA (US); Tarang Desai, Encino, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/808,212

(22) Filed: Mar. 3, 2020

(65) Prior Publication Data
US 2021/0281641 A1    Sep. 9, 2021

(51) Int. Cl.
H04L 29/08 (2006.01)
H04L 29/06 (2006.01)
H04L 12/841 (2013.01)
H04L 12/801 (2013.01)
H04W 76/11 (2018.01)

(52) U.S. Cl.
CPC .......... H04L 67/1095 (2013.01); H04L 47/28 (2013.01); H04L 47/34 (2013.01); H04L 67/14 (2013.01); H04L 67/42 (2013.01); H04W 76/11 (2018.02)

(58) Field of Classification Search
CPC ..... H04L 67/1095; H04L 67/14; H04L 67/42; H04L 47/28; H04L 47/34; H04W 76/11; G06F 16/275; G06F 7/14
USPC .......................................................... 709/220
See application file for complete search history.

(56) References Cited

U.S. PATENT DOCUMENTS

| | | | | |
|---|---|---|---|---|
| 7,529,780 | B1* | 5/2009 | Braginsky | H04L 67/42 |
| 7,756,825 | B2* | 7/2010 | Khosravy | G06F 16/275 |
| | | | | 707/611 |
| 10,187,445 | B2* | 1/2019 | Wu | G06F 16/27 |
| 2009/0282125 | A1* | 11/2009 | Jeide | H04L 67/1095 |
| | | | | 709/217 |
| 2010/0121874 | A1* | 5/2010 | Palay | G06F 16/275 |
| | | | | 707/769 |
| 2015/0199414 | A1* | 7/2015 | Braginsky | G06F 16/172 |
| | | | | 707/613 |

* cited by examiner

Primary Examiner — Glenford J Madamba
(74) Attorney, Agent, or Firm — Schwegman Lundberg & Woessner, P.A.

(57) ABSTRACT

Systems and methods are provided for synchronizing messages. The systems and methods include operations for: receiving, from a server by a client device, a set of synchronization data representing changes since a previous time the client device synchronized with the server; comparing, by the client device, the set of synchronization data to a local state of the synchronization data; identifying a difference between the set of synchronization data and the local state of the synchronization data; and transmitting, to the server by the client device, a request for content corresponding to the difference between the set of synchronization data and the local state of the synchronization data.

20 Claims, 9 Drawing Sheets

MINIMIZING NUMBER OF SYNCHS

TECHNICAL FIELD

The present disclosure generally relates to the technical field of social networks. In particular, the present embodiments are generally directed to managing message synchronization.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
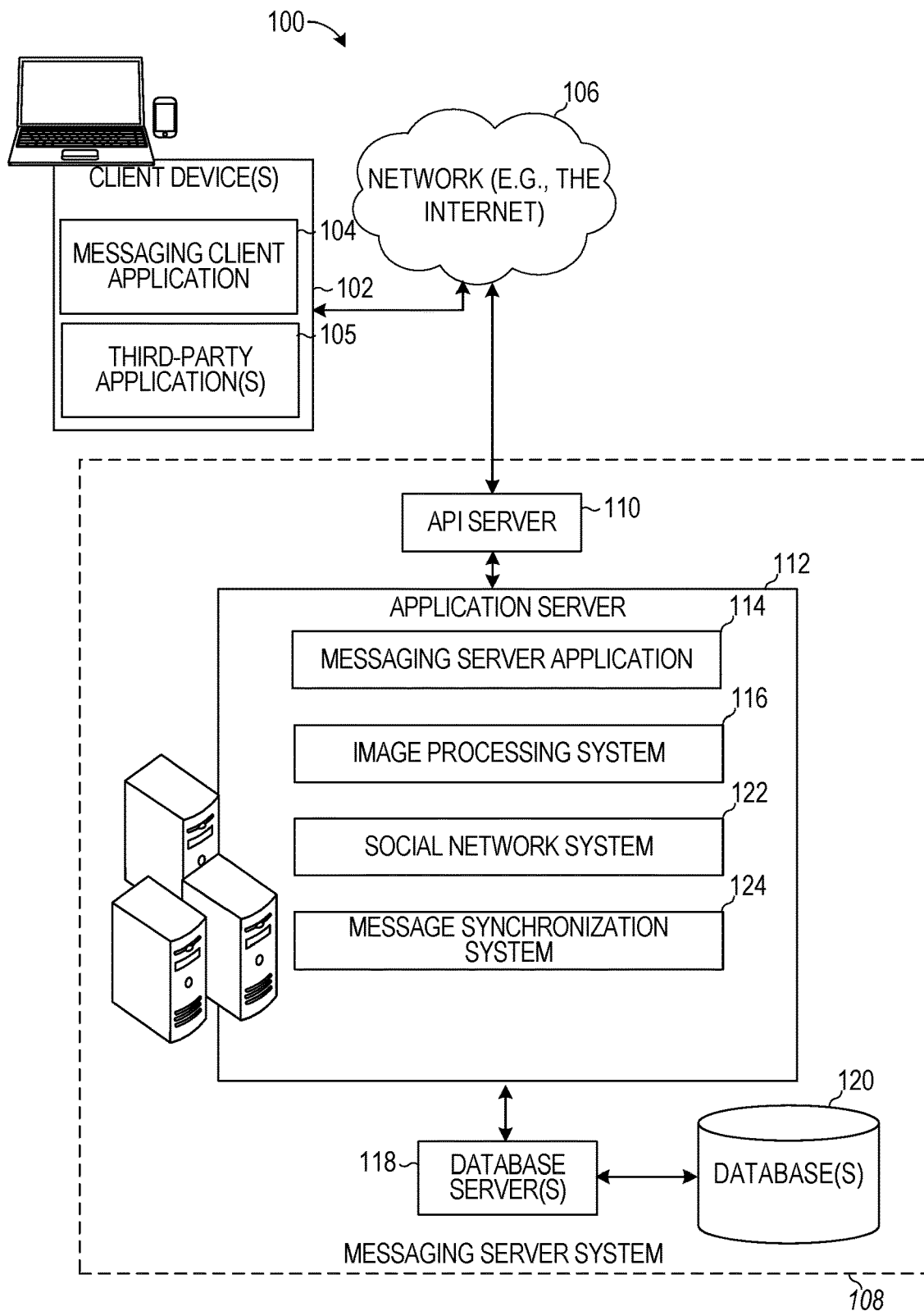
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on their mobile device. Such media content is typically exchanged in chat sessions between users. Sometimes users log on and log off a server that maintains the contents of the chat sessions. In order to ensure that the latest chat messages, that were exchanged in the chat session while the user device has been disconnected from the server, are presented to the user, a user device synchronizes with the server. Typically, the server will send the content of all the messages that were exchanged while the user device was disconnected from the server. Some of these messages are rich in large-sized content, such as videos and images. Synchronizing such content between a server and a user device consumes a great deal of processing resources and network bandwidth which makes synchronization sessions operate inefficiently. Also, synchronizing such content can take a long time which further delays presenting the latest chat messages to the user and can end up frustrating the users.

The disclosed embodiments improve the efficiency of using the electronic device by providing a system that efficiently synchronizes content between a server and a user device. According to the disclosed system, only content that differs between the user device and the server is transmitted to the user device in a synchronization session. In this way, if the user device obtained content by other means, such as from an out-of-band source, while the user device was disconnected from the server, the server need not transmit such content to the user device as part of the synchronization data when the user device ultimately connects back to the server. Specifically, the disclosed system receives, from a server, a set of synchronization data representing changes since a previous time the messaging application synchronized with the server and compares the set of synchronization data to a local state of the synchronization data. The disclosed system identifies a difference between the set of synchronization data and the local state of the synchronization data and transmits, to the server, a request for content corresponding to the difference between the set of synchronization data and the local state of the synchronization data.

Rather than sending the entire contents of the messages exchanged as part of a communication session after a user device disconnected from a server, the disclosed system only sends those messages that the user device did not obtain by other means, such as from an out-of-band source. Specifically, the user device may end a connection with a server and may receive a first set of messages from a push source, a pull source, a bi-directional link to another source, and/or a real-time link. Later, the user device may connect back to the server to receive a set of synchronization data identifying a second set of messages exchanged since the user device disconnected from the server. The user device determines a difference between the first set of messages the user device received and the second set of messages and only requests that the server provide to the user device those messages that correspond to the difference. This increases the efficiencies of the electronic device by reducing processing times and network bandwidth needed to accomplish a task.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party applications) 105 and/or indirectly (e.g., via one or more servers) from the messaging client application 104 to the third-party application(s) 105.

The third-party application(s) 105 and the messaging client application 104 are applications that include a set of functions that allow the client device 102 to access a message synchronization system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104, Such operations include transmitting data to, receiving data from, and processing data generated by the messaging client application 104. This data may include message content, client device information, geolocation information, media annotation and overlays, virtual objects, message content persistence conditions, social network information, and live event information, as examples, Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114; an image processing system 116, a social network system 122, and the message synchronization system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104, Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the message synchronization system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The message synchronization system 124 manages synchronization of messages exchanged in a communication session. For example, the message synchronization system 124 establishes a communication session between a plurality of users (e.g., a chat session in which multiple chat messages are exchanged). The messaging client application 104 implemented on the client device 102 communicates with the message synchronization system 124 to receive messages transmitted as part of the communication session. Specifically, messages are sent from one user to another via the message synchronization system 124. The message synchronization system 124 keeps track of all the messages that are exchanged and sends updates to client device 102 that are connected to the message synchronization system 124.

In some cases, the message synchronization system 124 stores data indicating a last time a given client device 102 or messaging client application 104 was connected to and received an update from the message synchronization system 124. For example, the messaging client application 104 may go offline (e.g., because a user closed the application and/or because of loss of Internet connectivity), Once the same messaging client application 104 connects back to the message synchronization system 124, the message synchronization system 124 determines whether additional messages were exchanged or sent by users in the communication session. Particularly, the message synchronization system 124 retrieves the timestamp of the last time the given client device 102 was connected to the message synchronization system 124. The message synchronization system 124 compares the timestamp to timestamps of messages exchanged in the communication session to identify a set of messages that were exchanged after the timestamp of the last time the given client device 102 was connected to the message synchronization system 124. Namely, the message synchronization system 124 identifies timestamps that follow the timestamp of the last time the given client device 102 was connected to the message synchronization system 124.

The message synchronization system 124 generates synchronization data based on the identified set of messages that were exchanged after the last time the given client device 102 was connected to the message synchronization system 124. In some cases, the synchronization data includes a vector of sequence numbers of messages that were exchanged. In some implementations, the vector identifies users who participate in the communication session and sequence numbers of messages sent by such users. In some cases, the vector is a matrix in which columns of the matrix represent different participants of the communication session and rows of the matrix represent sequence numbers of messages sent by the different participants.

The message synchronization system 124 sends the synchronization data to the given client device 102. The given client device 102 generates a vector that represents locally stored messages exchanged in the communication session. The given client device 102 identifies differences between the vector generated by the given client device 102 and the synchronization data received from the message synchronization system 124. As an example, the given client device 102 compares the locally generated vector of sequence numbers and the vector of sequence numbers received from the message synchronization system 124.

The given client device 102 determines one or more messages that have been exchanged in the communication session and which have not already been received by, given client device 102 from another source, such as an out-of-band source. Specifically, the given client device 102 determines one or more messages that are stored by the message synchronization system 124 as part of the communication session and that were exchanged after the given client device 102 disconnected from the server and that are not already part of the locally stored messages of the given client device 102. For example, after the given client device 102 disconnects from the server, the given client device 102 receives messages that are part of the same communication session from another source. As an example, the given client device 102 receives messages by way of a push mechanism, a pull mechanism, a real-time connection, a bi-directional communication to another server, and so forth. In some cases, the given client device 102 receives the messages from the same server that is used to synchronize messages with the given client device 102 but by other mechanisms that are not part of the synchronization session. In some cases, the given client device 102 receives multiple copies of the same messages through many different mechanisms, such as a synchronization session, a push mechanism, a pull mechanism, or a real-time continuous bi-directional connection to the server or another source. The given client device 102 may employ the techniques described herein to reduce network bandwidth by comparing a vector of sequence numbers of messages exchanged in a communication session received from another source with a locally generated vector to only request message contents of sequence numbers missing from the locally generated vector.

In some embodiments, the given client device 102 identifies sequence numbers associated with one or more participants in the communication session that are included in the synchronization data received from the server but that are not included in the locally generated vector of sequence numbers. The client device 102 then transmits a request to the server to only send the message contents corresponding to the missing messages (e.g., the message contents corresponding to the identified sequence numbers—the difference between the locally generated vector and the vector received from the message synchronization system 124). The message synchronization system 124 accesses the communication session message information, retrieves the message contents of the identified sequence numbers and sends to the given client device 102 the retrieved message contents. The given client device 102 is now again synchronized with the server and updates the locally stored messages that are part of the communication session.

In some embodiments, the message synchronization system 124 does not send the synchronization data to the given client device 102. Rather, when the given client device 102 requests to synchronize with the message synchronization system 124, the given client device 102 generates a vector of sequence numbers representing the locally stored messages of the communication session. The given client device 102 sends this vector of sequence numbers to the message synchronization system 124 with a request to synchronize. The message synchronization system 124 then generates a current version of the vector of sequence numbers for the communication session. The message synchronization system 124 compares the vector received from the given client device 102 with the vector generated by the message synchronization system 124. The message synchronization system 124 identifies differences (if any) between the two vectors. The message synchronization system 124 retrieves the sequence numbers and participant identifiers corresponding to the difference (e.g., identifies any sequence numbers that are in the vector generated by the message synchronization system 124 that are not also in the vector received from the given client device 102). Then, the message synchronization system 124 obtains one or more messages corresponding to the differences and transmits to the given client device 102 only the messages corresponding to the difference in sequence numbers.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
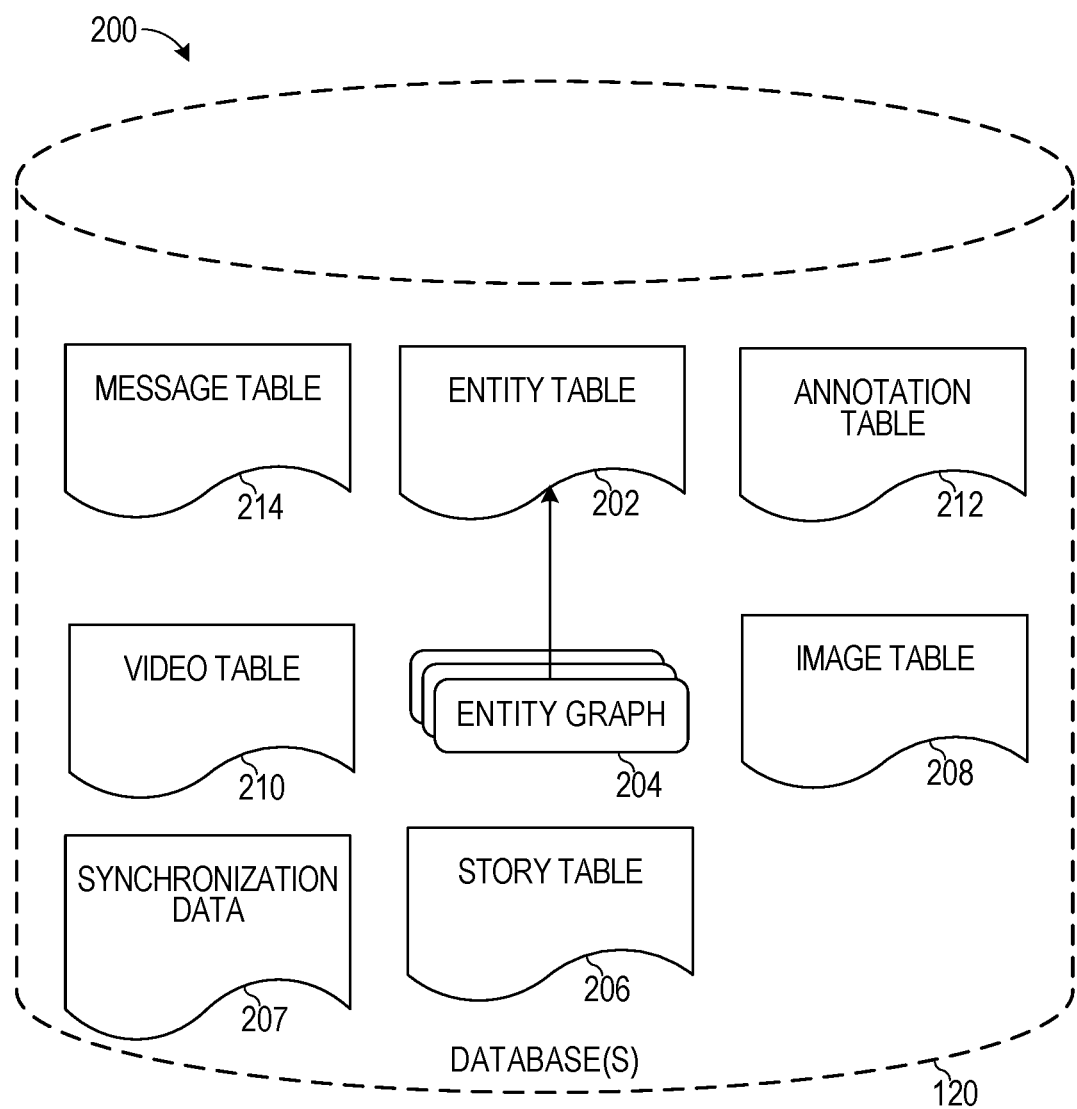
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Synchronization data 207 stores various information about messages exchanged in a communication session. Such information includes a timestamp representing the last time an update was sent to each client device 102 and/or messaging client application 104 associated with a participant of a communication session (e.g., the timestamp of the last time the client device 102 or messaging client application 104 was connected to the message synchronization system 124 in a synchronization session).

The information may further include a vector or matrix representing participants to a communication session and/or sequence numbers of messages sent by the respective participants. The sequence numbers are associated with the messages and can be used to uniquely identify each respective message that is exchanged in the communication session. As an example, a client device 102 may send a sequence number to the message synchronization system 124 and request content or messages associated with the sequence number. The message synchronization system 124 accesses the synchronization data 207 information to identify the contents or message associated with the received sequence number and sends the contents or message associated with the sequence number to the client device 102. In some cases, the message synchronization system 124 uses the synchronization data 207 information to identify a set of synchronization data (e.g., a vector of sequence numbers) that includes identifiers of messages with timestamps that follow the last time a given client device 102 was connected to the message synchronization system 124.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
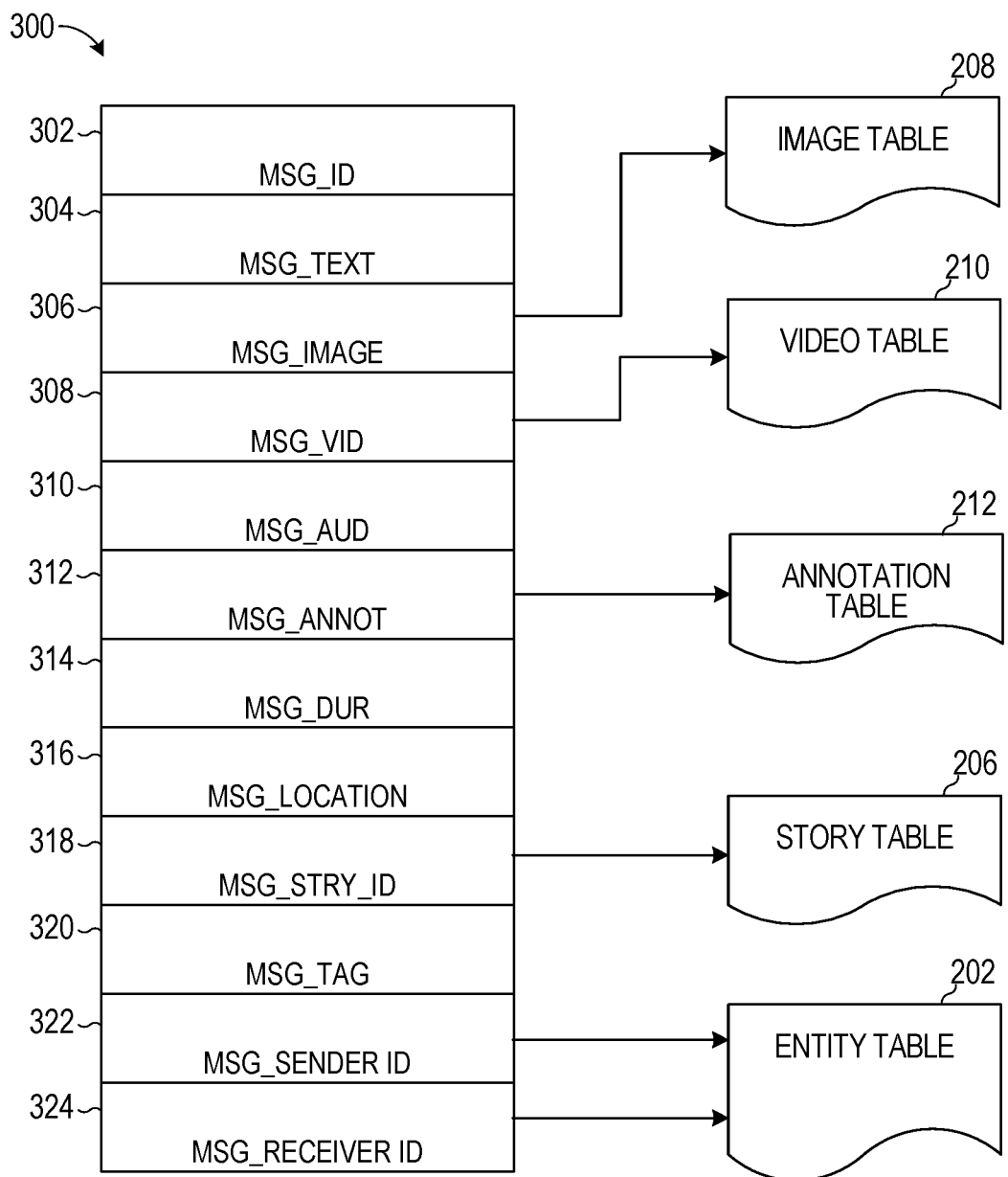
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
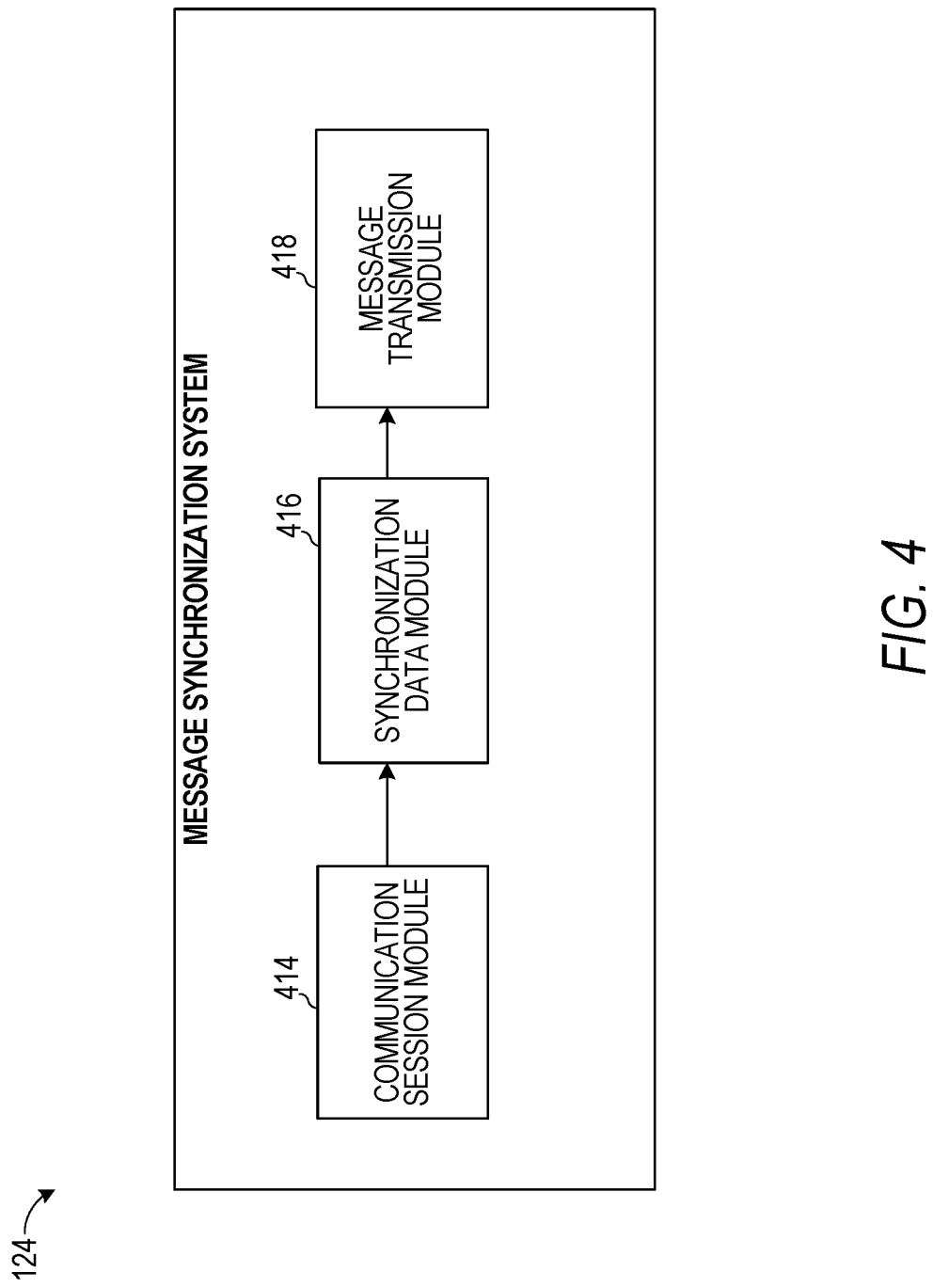
FIG. 4 is a block diagram showing an example message synchronization system, according to example embodiments.

FIG. 4 is a block diagram showing an example message synchronization system 124, according to example embodiments. Message synchronization system 124 includes a communication session module 414, a synchronization module 416, and a message transmission module 418. The communication session module 414 enables users to engage in a communication session to exchange messages with each other. In some cases, the communication session includes a group of three or more users in which case any message sent by one user is viewable by the other two users in the group. In some cases, the communication session includes only two users where one user sends messages to another user and vice versa.

After initiating a communication session using the communication session module 414, messages are transferred between users of the communication session using the communication session module 414. For example, the communication session module 414 receives a message from a first user in the communication session and marks the message for transmission to a second user in the communication session. The communication session module 414 stores the message along with various information indicating the recipient, the communication session identifier, a sequence number, an identifier of the sender, and a timestamp representing when the message was received. In some cases, in response to receiving a given message from a participant or sender, the communication session module 414 identifies a vector associated with the participant or sender and the value of the last sequence number that is stored in the vector. The communication session module 414 increments the value of the last sequence number that is stored to generate a new sequence number for the given message, associates the new sequence number with the given message, and adds the new sequence number to the vector stored for the sender or participant. In this way, each participant of the communication session is assigned a vector with sequence numbers representing messages sent by the respective participants.

When the second user logs into the message application, the communication session module 414 receives an identifier of the second user and determines whether any messages that have not been delivered yet to the second user and that are intended for the second user to receive. In some cases, the communication session module 414 receives a last update timestamp from the second user. The communication session module 414 searches the receive time of all the messages that are intended for receipt by the second user. The communication session module 414 selects those messages that have a receive time that is later than the last update timestamp. The communication session module 414 then sends all of the selected messages to the user device of the second user for presentation in the communication session of the message client application 104.

In some embodiments, after a given user of the communication session logs off, the communication session module 414 stores a timestamp indicating the last time an update was sent to the client device 102 of the user. In some embodiments, the communication session module 414 continuously updates the timestamp for a given client device 102 each time an update including new messages of the communication session is sent to the given client device 102. This way, the timestamp always represents the last time the given client device 102 was connected to and received a message from the communication session module 414.

In some embodiments, after the given user logs off, the given client device 102 of the given user may receive messages that are part of the communication session from an out-of-band source. For example, the given client device 102 may receive a message in a pull mechanism, a push mechanism, a bi-directional link source, a real-time source, and/or any combination thereof. At a later time, the given client device 102 may establish a connection again with the communication session module 414. At that time, the communication session module 414 instructs the synchronization module 416 to send synchronization data to the given client device 102 to ensure that the given client device 102 has all of the messages that are part of the communication session.

The synchronization module 416 retrieves a device identifier of the given client device 102. The synchronization module 416 uses the device identifier to retrieve a timestamp of the last time an update was sent to the given client device 102 in a synchronization session. The synchronization module 416 retrieves an identifier of the communication session to be updated and uses the identifier to access a list of messages exchanged in the communication session. The synchronization module 416 retrieves timestamps of the messages exchanged in the communication session and searches the retrieved timestamps for those timestamps that follow the timestamp of the last time an update was sent to the given client device 102. The synchronization module 416 generates the synchronization data using the set of messages associated with the timestamps that follow the timestamp of the last time an update was sent to the given client device 102.

In some embodiments, the synchronization module 416 generates a vector of sequence numbers and participant identifiers using the set of messages. Namely, the synchronization module 416 generates a vector that includes sequence numbers or identifiers of messages that the synchronization module 416 identifies were exchanged during the period of time following the last time the given client device 102 last received an update or was last connected to the communication session module 414. The synchronization module 416 sends the synchronization data (e.g., the vector of sequence numbers) to the given client device 102.

The given client device 102 generates a local data set representing messages exchanged in the communication session that are locally stored. In some cases, the given client device 102 generates a vector that represents participants to the communication session and the sequence numbers of the messages sent by the participants that are stored on the given client device 102. The given client device 102 compares the received synchronization data with the local data set to identify differences. For example, the given client device 102 compares the vector of sequence numbers received from the synchronization module 416 to the locally generated vector of sequence numbers. In some embodiments, the synchronization module 416 receives the vector of sequence numbers from the given client device 102 instead of sending the synchronization data to the given client device 102. Namely, the synchronization module 416 does not send the vector of sequence numbers to the given client device 102 but receives the vector of sequence numbers from the given client device 102 as a request to synchronize. The synchronization module 416 compares the vector of sequence numbers received from the given client device 102 with a vector of sequence numbers generated by the synchronization module 416. The synchronization module 416 identifies any differences and automatically sends content or messages corresponding to the differences (e.g., sends messages corresponding to sequence numbers that are in the vector generated by the synchronization module 416 that are not also in the vector received from the given client device 102).

The given client device 102 sends a request to the synchronization module 416 for content associated with the difference between the synchronization data received from the synchronization module 416 and the locally generated data set. As an example, the given client device 102 identifies a set of sequence numbers that are included in the vector of sequence numbers received from the synchronization module 416 but that are not included in the vector of sequence numbers generated from the locally stored messages. In such cases, the given client device 102 sends to the synchronization module 416 a request for messages associated with the identified set of sequence numbers that are included in the vector of sequence numbers received from the synchronization module 416 but that are not included in the vector of sequence numbers generated from the locally stored messages. In some cases, the given client device 102 determines that there are no differences between the synchronization data received from the synchronization module 416 and the locally generated data set. In such cases, the given client device 102 may skip synchronization with the synchronization module 416 and instruct the synchronization module 416 to update the time stamp indicating the last time an update was sent to the given client device 102 to be the current time.

In response to receiving the request from the given client device 102, the synchronization module 416 instructs the message transmission module 418 to retrieve one or more messages corresponding to the received request. For example, the synchronization module 416 instructs the message transmission module 418 to retrieve messages associated with the sequence numbers received from the given client device 102. The message transmission module 418 obtains the messages and transmits the obtained messages to the given client device 102. The given client device 102 updates the communication session that is stored and maintained locally and displayed to the user with the messages obtained from the message transmission module 418.

Figure 5:
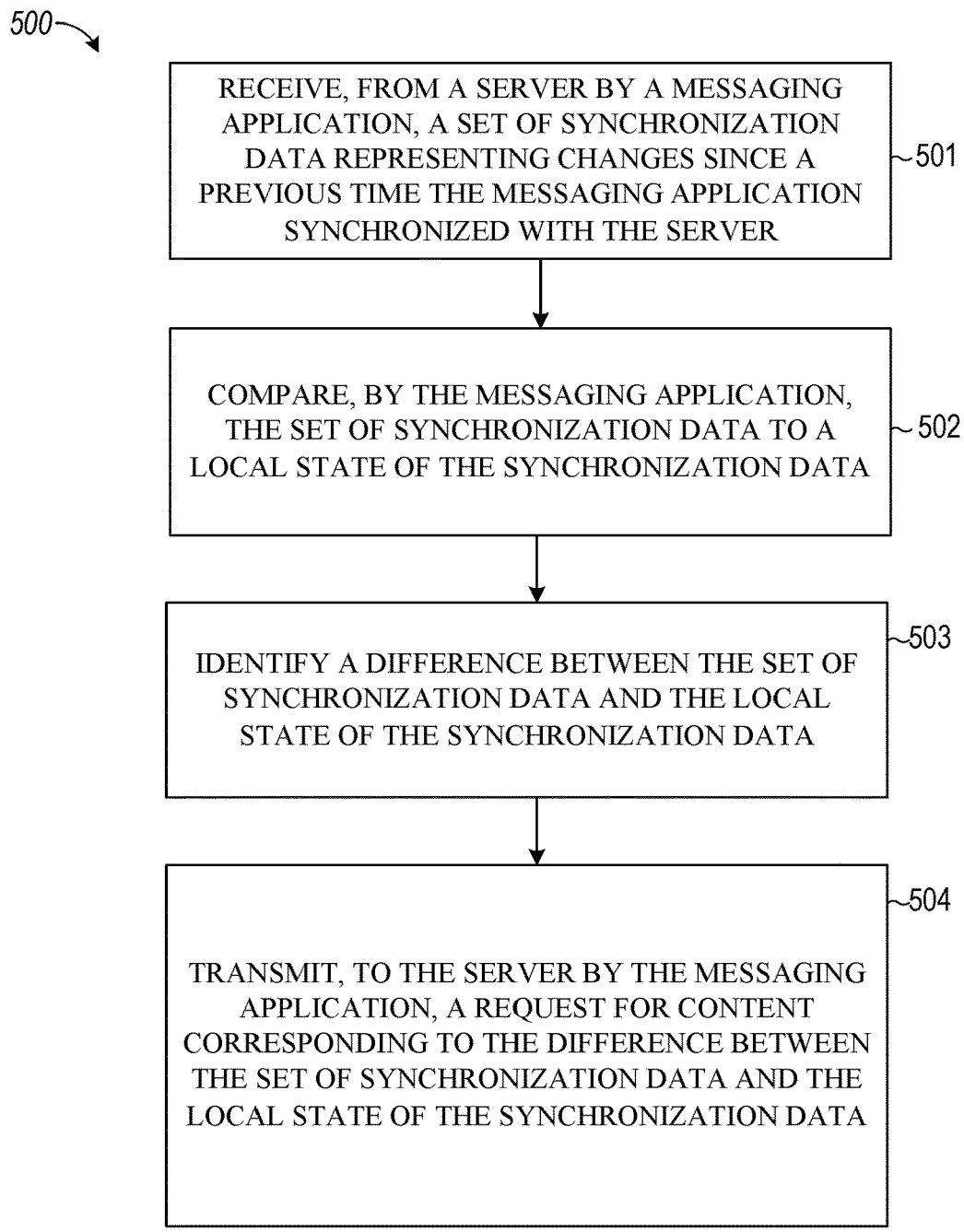
FIG. 5 is a flowchart illustrating example operations of the message synchronization system, according to example embodiments.

FIG. 5 is a flowchart illustrating example operations of the message synchronization system 124 in performing process 500, according to example embodiments. The process 5000 may be embodied in computer-readable instructions for execution by one or more processors such that the operations of the process 500 may be performed in part or in whole by the functional components of the messaging server system 108, client device 102, and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the computing system (e.g., client device 102 and/or messaging client application 104) receives, from a server, a set of synchronization data representing changes since a previous time the computing system or messaging application synchronized with the server. For example, the given client device 102 receives a vector of sequence numbers from the synchronization module 416 corresponding to messages that were exchanged after the last time the given client device 102 received an update from the synchronization module 416.

At operation 502, the computing system compares the set of synchronization data to a local state of the synchronization data. For example, the client device 102 locally generates a vector of sequence numbers based on messages in a communication session that are locally stored on the client device 102.

At operation 503, the computing system identifies a difference between the set of synchronization data and the local state of the synchronization data. For example, the client device 102 identifies sequence numbers that are in the vector received from the synchronization module 416 that are not also in the vector locally generated by the client device 102.

At operation 504, the computing system transmits to the server a request for content corresponding to the difference between the set of synchronization data and the local state of the synchronization data. For example, the client device 102 sends a request to the synchronization module 416 to send messages to the client device 102 corresponding to the sequence numbers that are in the vector received from the synchronization module 416 that are not also in the vector generated by the client device 102.

Figure 6:
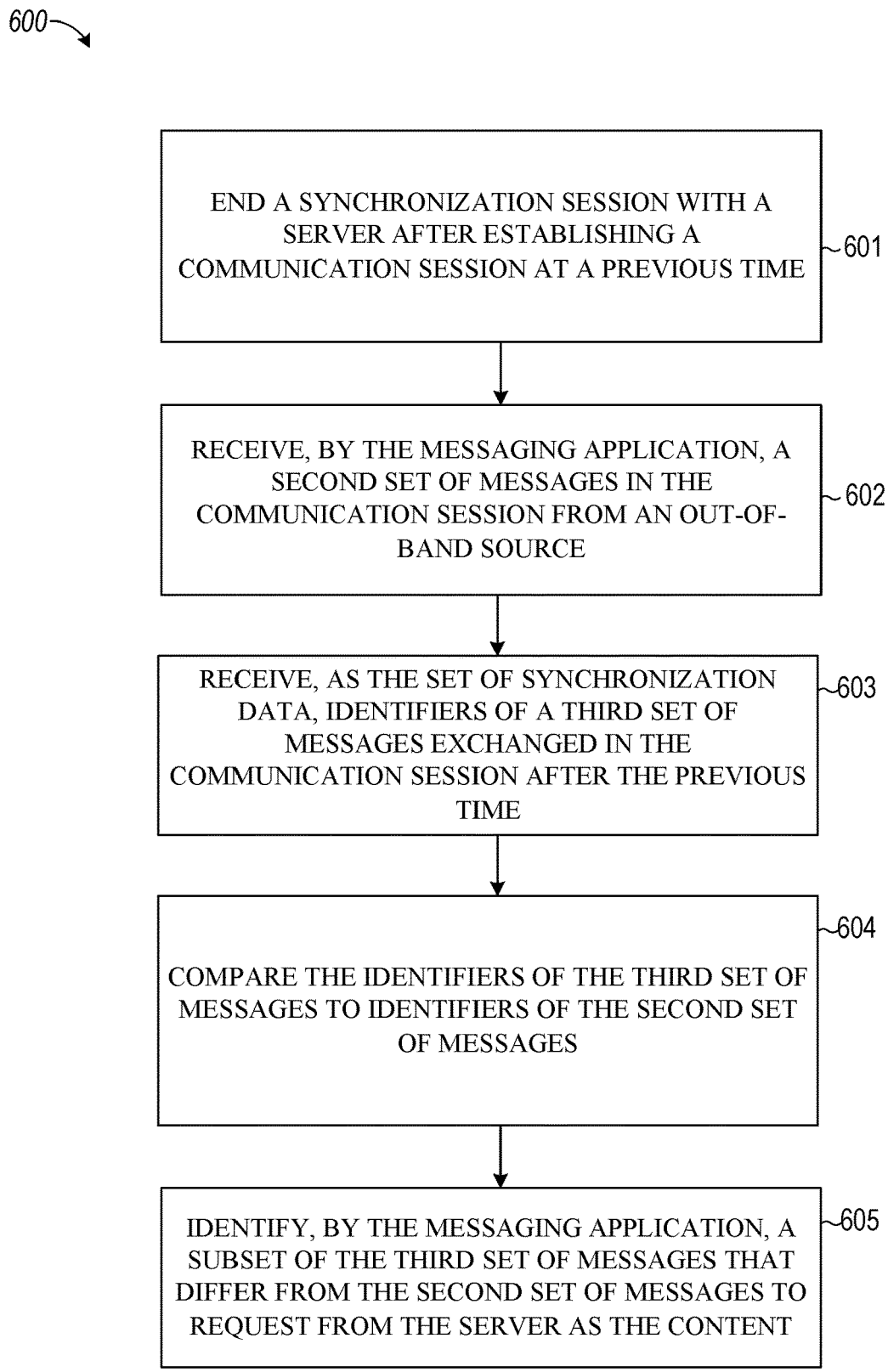
FIG. 6 is a flowchart illustrating example operations of the message synchronization system, according to example embodiments.

FIG. 6 is a flowchart illustrating example operations of the message synchronization system 124 in performing process 600, according to example embodiments. The process 600 may be embodied in computer-readable instructions for execution by one or more processors such that the operations of the process 600 may be performed in part or in whole by the functional components of the messaging server system 108, client device 102, and/or third-party application 105; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the computing system (e.g., client device 102 and/or messaging client application 104) ends a synchronization session with a server after establishing a communication session at a previous time. For example, the client device 102 disconnects from the message synchronization system 124 after establishing a chat session in which messages are exchanged. In response, the message synchronization system 124 stores a timestamp representing a last time an update was sent to the client device 102.

At operation 602, the computing system receives a second set of messages in the communication session from an out-of-band source. For example, the client device 102 receives one or more messages of the communication session from a pull mechanism, a push mechanism, a real-time link, and/or a bi-directional link to another source.

At operation 603, the computing system receives, as the set of synchronization data, identifiers of a third set of messages exchanged in the communication session after the previous time. For example, the client device 102 receives a vector of sequence numbers from the message synchronization system 124 representing all messages exchanged in the communication session.

At operation 604, the computing system compares the identifiers of the third set of messages to identifiers of the second set of messages. For example, the client device 102 compares the received vector of sequence numbers to a locally generated vector of sequence numbers.

At operation 605, the computing system identifies a subset of the third set of messages that differ from the second set of messages to request from the server as the content. For example, the client device 102 identifies sequence numbers in the vector received from the message synchronization system 124 that are not also in the vector of sequence numbers that was locally generated.

Figure 7:
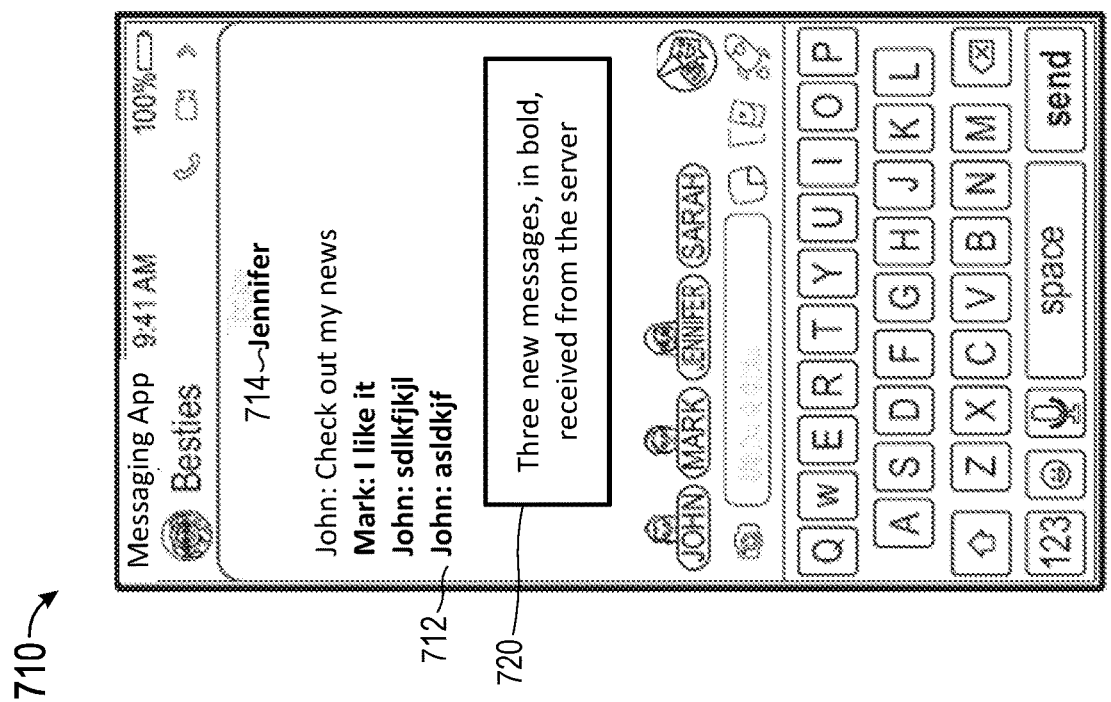
FIG. 7 shows illustrative inputs and outputs of the message synchronization system, according to example embodiments.

FIG. 7 includes illustrative inputs and outputs of the message synchronization system 124, according to example embodiments. The message synchronization system 124 may cause a graphical user interface 710 to be presented on a messaging client application 104. The graphical user interface 710 includes a display of messages that are part of a communication session between multiple users (e.g., John, Mark and Jennifer). The graphical user interface 710 is presented to given user 714 (e.g., Jennifer). In some cases, once the given user 714 logs in and synchronizes the messages that are part of the communication session (e.g., at 9:41 AM), the message synchronization system 124 provides messages that are specifically requested by the client device 102. The messages that are provided to the client device 102 that were exchanged since the last time the client device 102 was connected to the message synchronization system 124 and that were not received from an out-of-band source may be visually distinguished from other messages by being presented in a bold font).

In one example, a notification 720 is presented to the given user 714 in the graphical user interface 710 indicating that three new messages were received from the message synchronization system 124 and that the new messages are presented in bold. In some cases, an earlier message may have been received by the client device 102 from an out-of-band source after the client device 102 disconnected from the message synchronization system 124. Such earlier messages are not requested to be received from the message synchronization system 124 after the client device 102 again connects and synchronizes with the server. Also, such messages are not presented in bold or are not visually distinguished as such messages were locally stored and not requested to be received from the message synchronization system 124.

Figure 8:
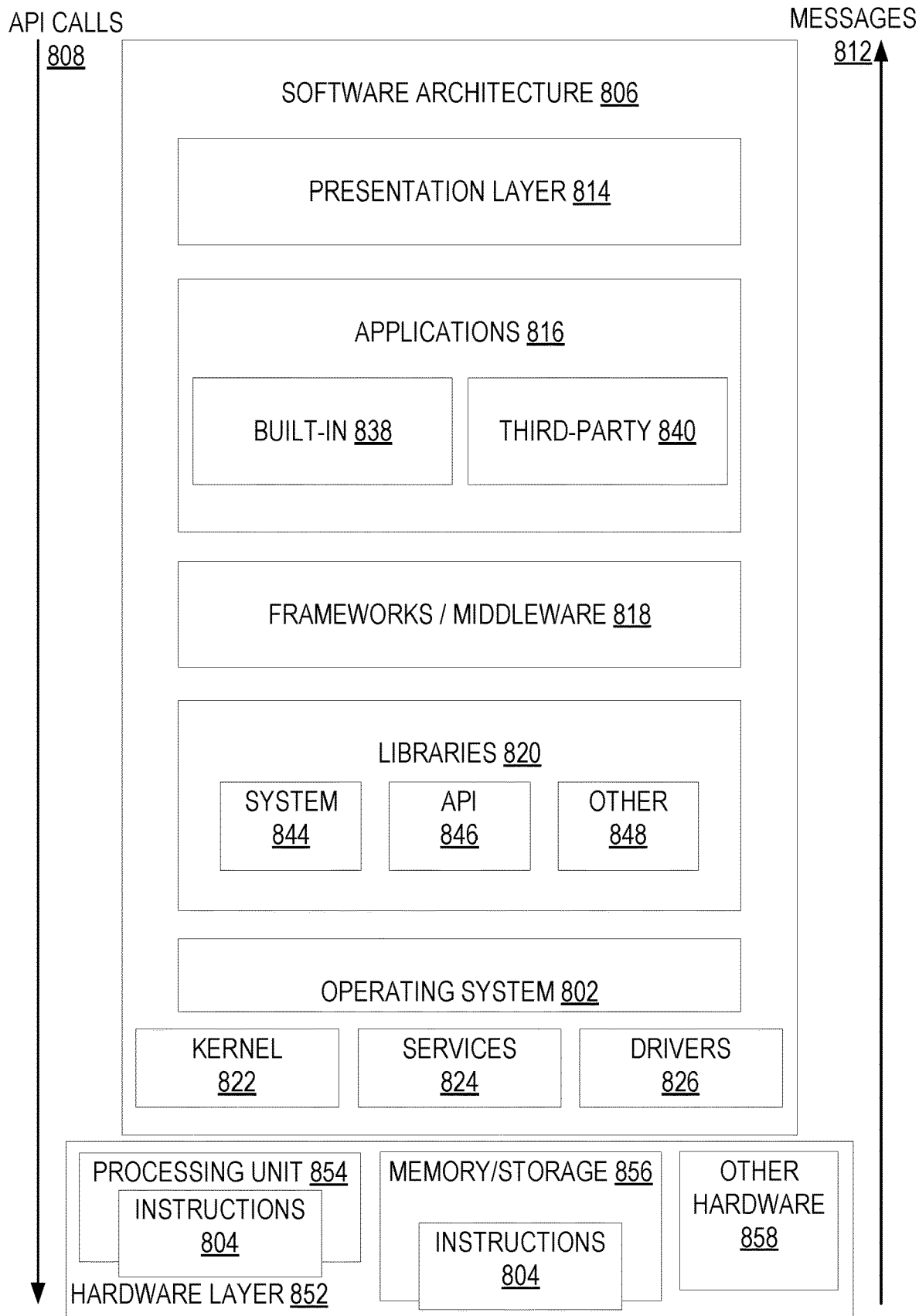
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
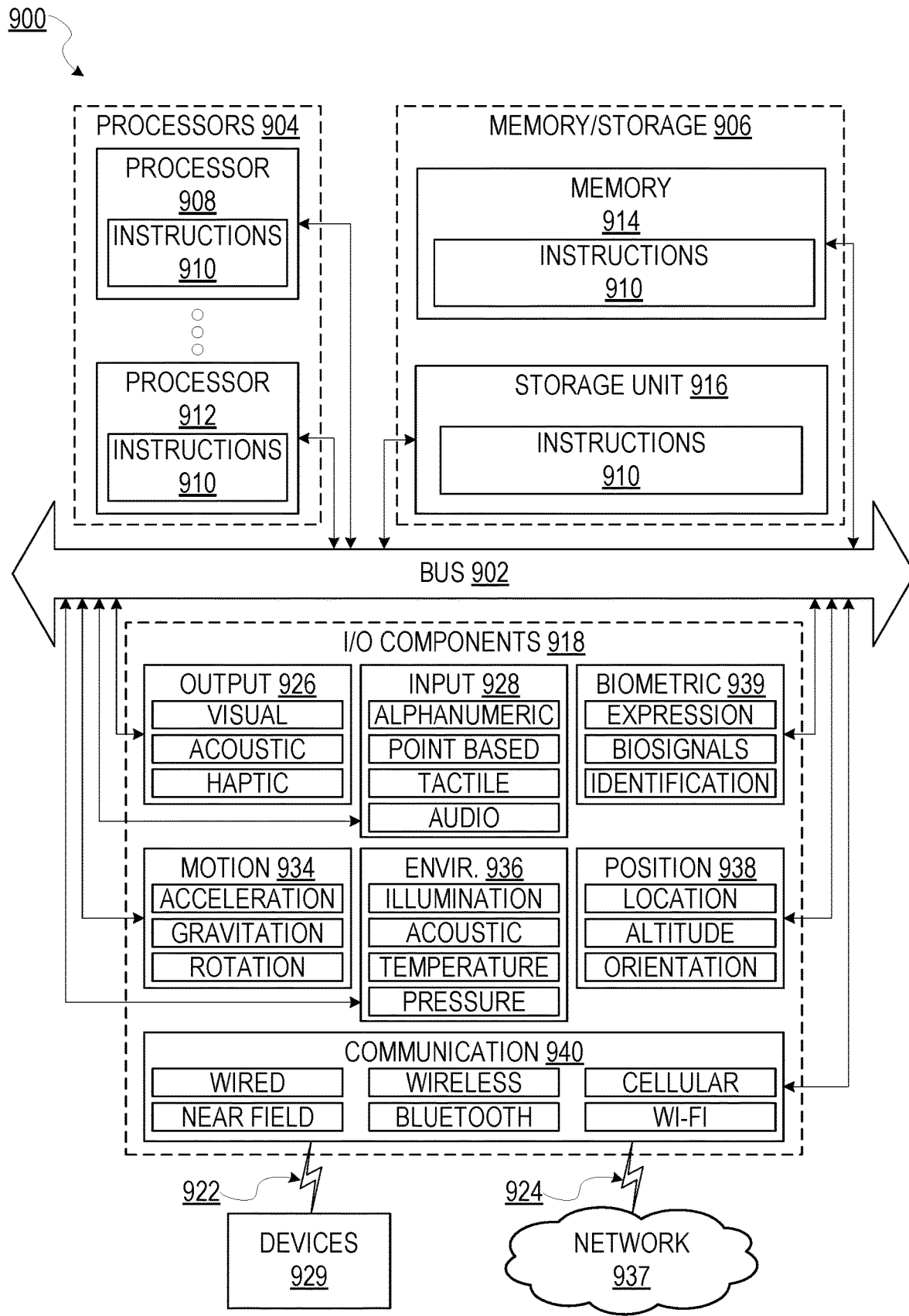
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone; a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CNC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions 910 contemporaneously. Although FIG. 9 shows multiple processors 904, the machine 900 may include a single processor 908 with a single core, a single processor 908 with multiple cores (e.g., a multi-core processor), multiple processors 908, 912 with a single core, multiple processors 908, 912 with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will Likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PUP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 9:37 or devices 929 via coupling 924 and coupling 922, respectively. For example, the communication components 940 may include a network interface component or other suitable device to interface with the network 937. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 929 may be another machine 900 or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting a NFC beacon signal that may indicate a particular location, and so forth.

GLOSSARY

"CARRIER SIGNAL," in this context, refers to any intangible medium that is capable of storing, encoding, or carrying transitory or non-transitory instructions 910 for execution by the machine 900, and includes digital or analog communications signals or other intangible medium to facilitate communication of such instructions 910. Instructions 910 may be transmitted or received over the network 106 using a transitory or non-transitory transmission medium via a network interface device and using any one of a number of well-known transfer protocols.

"CLIENT DEVICE," in this context, refers to any machine 900 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK," in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (ENDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM," in this context, refers to a component, device, or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 908 or other programmable processor. Once configured by such software, hardware components become specific machines (or specific components of a machine 900) uniquely tailored to perform the configured functions and are no longer general-purpose processors 908. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 908 configured by software to become a special-purpose processor, the general-purpose processor 908 may be configured as respectively different special-purpose processors (e.g., comprising different hardware components) at different times. Software accordingly configures a particular processor 908 or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor 908 or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 106 (e.g., the Internet) and via one or more appropriate interfaces (e.g., an API) The performance of certain of the operations may be distributed among the processors, not only residing within a single machine 900, but deployed across a number of machines. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR," in this context, refers to any circuit or virtual circuit (a physical circuit emulated by logic executing on an actual processor 908) that manipulates data values according to control signals (e.g., "commands," "op codes," "machine code," etc.) and which produces corresponding output signals that are applied to operate a machine 900. A processor 908 may, for example, be a CPU, a RISC processor, a CISC processor, a GPU, a DSP, an ASIC, a RFIC or any combination thereof. A processor 908 may further be a multi-core processor having two or more independent processors 904 (sometimes referred to as "cores") that may execute instructions 910 contemporaneously.

"TINIEST/VW," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   after ending a synchronization session between a client device and a server, receiving, by the client device, content from an out-of-band source;
   after receiving the content from the out-of-band source receiving, from the server by one or more processors of the client device, a set of synchronization data representing changes since a previous time the client device synchronized with the server;

generating a local state of synchronization data based on the content received from the out-of-band source;

comparing, by the one or more processors of the client device, the set of synchronization data to the local state of the synchronization data;

identifying a difference between the set of synchronization data and the local state of the synchronization data; and transmitting, to the server by the one or more processors of the client device, a request for content corresponding to the difference between the set of synchronization data and the local state of the synchronization data.

2. The method of claim 1, further comprising establishing a communication session between a plurality of users, wherein the set of synchronization data comprises identifiers of one or more messages exchanged in the communication session.

3. The method of claim 1, wherein the difference identifies a given message exchanged in a communication session, and wherein the request for content comprises a request for the given message exchanged in the communication session.

4. The method of claim 1, further comprising:
receiving, by the server, a synchronization request from a messaging application;
identifying, by the server, a given timestamp representing the previous time the messaging application synchronized with the server;
retrieving timestamps of content stored by the server;
identifying a set of timestamps that are later in time than the given timestamp; and
generating the set of synchronization data based on the set of timestamps.

5. The method of claim 4, wherein the previous time corresponds to a timestamp of a last time the server sent content to the messaging application.

6. The method of claim 4, wherein generating the set of synchronization data comprises generating a first vector of sequence numbers.

7. The method of claim 6, wherein identifying the difference comprises:
retrieving, by the messaging application, a second vector of sequence numbers; and
identifying one or more sequence numbers that differ between the first and second vectors.

8. The method of claim 7, wherein transmitting the request comprises transmitting the request for content corresponding to the one or more sequence numbers that differ between the first and second vectors.

9. The method of claim 6, wherein each sequence number represents a respective message sent by a participant in a communication session, and wherein each sequence number is associated with a participant identifier of the participant that sent the respective message.

10. The method of claim 1, further comprising:
storing as the previous time a timestamp at which the synchronization session has ended.

11. The method of claim 10, wherein the content is received over at least one of a bi-directional communication link, a pull mechanism, a push mechanism, or a real-time connection.

12. The method of claim 1, further comprising:
establishing a communication session on the client device comprising a first set of messages received from the server;

ending a synchronization session with the server after establishing the communication session at the previous time;

receiving, by the client device, a second set of messages in the communication session from an out-of-band source; and receiving, as the set of synchronization data, identifiers of a third set of messages exchanged in the communication session after the previous time.

13. The method of claim 12, further comprising:
comparing the identifiers of the third set of messages to identifiers of the second set of messages;
identifying, by the client device, a subset of the third set of messages that differ from the second set of messages; and
requesting, from the server, the subset of messages as the content.

14. The method of claim 1, wherein less than an entirety of content that was received by the server after the previous time is sent to the client device in response to the request.

15. The method of claim 1, further comprising:
receiving a second set of synchronization data representing changes since another previous time the client device synchronized with the server;
comparing the second set of synchronization data to a second local state of the synchronization data;
determining that the second set of synchronization data matches the second local state of the synchronization data; and
skipping transmitting, to the server, a request for content in response to determining that the second set of synchronization data matches the second local state of the synchronization data.

16. A system comprising:
a processor configured to perform operations comprising:
after ending a synchronization session between a client device and a server, receiving, by the client device, content from an out-of-band source;
after receiving the content from the out-of-band source, receiving, from the server by one or more processors of the client device, a set of synchronization data representing changes since a previous time the client device synchronized with the server;
generating a local state of synchronization data based on the content received from the out-of-band source:
comparing, by the one or more processors of the client device, the set of synchronization data to the local state of the synchronization data;
identifying a difference between the set of synchronization data and the local state of the synchronization data; and
transmitting, to the server by the one or more processors of the client device, a request for content corresponding to the difference between the set of synchronization data and the local state of the synchronization data.

17. The system of claim 16, wherein the set of synchronization data comprises a first vector of sequence numbers, and wherein the operations further comprise:
retrieving, by a messaging application, a second vector of sequence numbers; and
identifying one or more sequence numbers that differ between the first and second vectors;
transmitting the request for content corresponding to the one or more sequence numbers that differ between the first and second vectors.

18. The system of claim 16, wherein the difference identifies a given message exchanged in a communication session, and wherein the content comprises the given message exchanged in the communication session.

19. The system of claim 16, further comprising operations for:
receiving, by the server, a synchronization request from the client device;
identifying, by the server, a given timestamp representing the previous time the client device synchronized with the server;
retrieving timestamps of content stored by the server;
identifying a set of timestamps that are later in time than the given timestamp; and
generating the set of synchronization data based on the set of timestamps.

20. A non-transitory machine-readable storage medium that includes instructions that, when executed by one or more processors of a machine, cause the machine to perform operations comprising:
after ending a synchronization session between a client device and a server, receiving, by the client device, content from an out-of-band source;
after receiving the content from the out-of-band source, receiving; from the server by one or more processors of the client device, a set of synchronization data representing changes since a previous time the client device synchronized with the server;
generating a local state of synchronization data based on the content received from the out-of-band source;
comparing, by the one or more processors of the client device, the set of synchronization data to the local state of the synchronization data;
identifying a difference between the set of synchronization data and the local state of the synchronization data; and
transmitting, to the server by the one or more processors of the client device, a request for content corresponding to the difference between the set of synchronization data and the local state of the synchronization data.

* * * * *

UNITED STATES PATENT AND TRADEMARK OFFICE
CERTIFICATE OF CORRECTION

PATENT NO. : 11,201,918 B2
APPLICATION NO. : 16/808212
DATED : December 14, 2021
INVENTOR(S) : Baron et al.

It is certified that error appears in the above-identified patent and that said Letters Patent is hereby corrected as shown below:

In the Claims

In Column 22, Line 65, in Claim 1, after "source", insert --,--

In Column 24, Line 13, in Claim 13, delete "identifying;" and insert --identifying,-- therefor In Column 24, Line 45, in Claim 16, delete "source:" and insert --source;-- therefor In Column 26, Line 2, in Claim 20, delete "receiving;" and insert --receiving,-- therefor Signed and Sealed this
Thirty-first Day of October, 2023

Katherine Kelly Vidal
*Director of the United States Patent and Trademark Office*